United States Patent [19]
Park et al.

[11] Patent Number: 4,648,696
[45] Date of Patent: Mar. 10, 1987

[54] 35 MM AUTOMATIC FOCUS CAMERA CONTAINING AN INSTANT FILM

[76] Inventors: Sea C. Park; In P. Park, both of 3836 Birchwood, Skokie, Ill. 60067

[21] Appl. No.: 765,222

[22] Filed: Aug. 13, 1985

[51] Int. Cl.⁴ .......................................... G03B 17/50
[52] U.S. Cl. ..................................... 354/83; 354/288
[58] Field of Search ............... 354/174, 83, 202, 288, 354/295, 210

[56] References Cited

U.S. PATENT DOCUMENTS 3,491,671  1/1970  Engeldrum .................... 354/288
4,281,913  8/1981  Shono et al. ................. 354/210 X
4,348,086  9/1982  Forscher ....................... 354/174 X

FOREIGN PATENT DOCUMENTS 2032122  4/1980  United Kingdom ............... 354/210

Primary Examiner—L. T. Hix
Assistant Examiner—Brian W. Brown
Attorney, Agent, or Firm—Birch, Stewart, Kolasch & Birch

[57] ABSTRACT

A 35 mm automatic focus viewfinder or single lens reflex camera which can be modified to also function as a more sophisticated mid format or an instant film camera. The 35 mm camera is modified by a lens housing attachment and a film back means.

25 Claims, 23 Drawing Figures

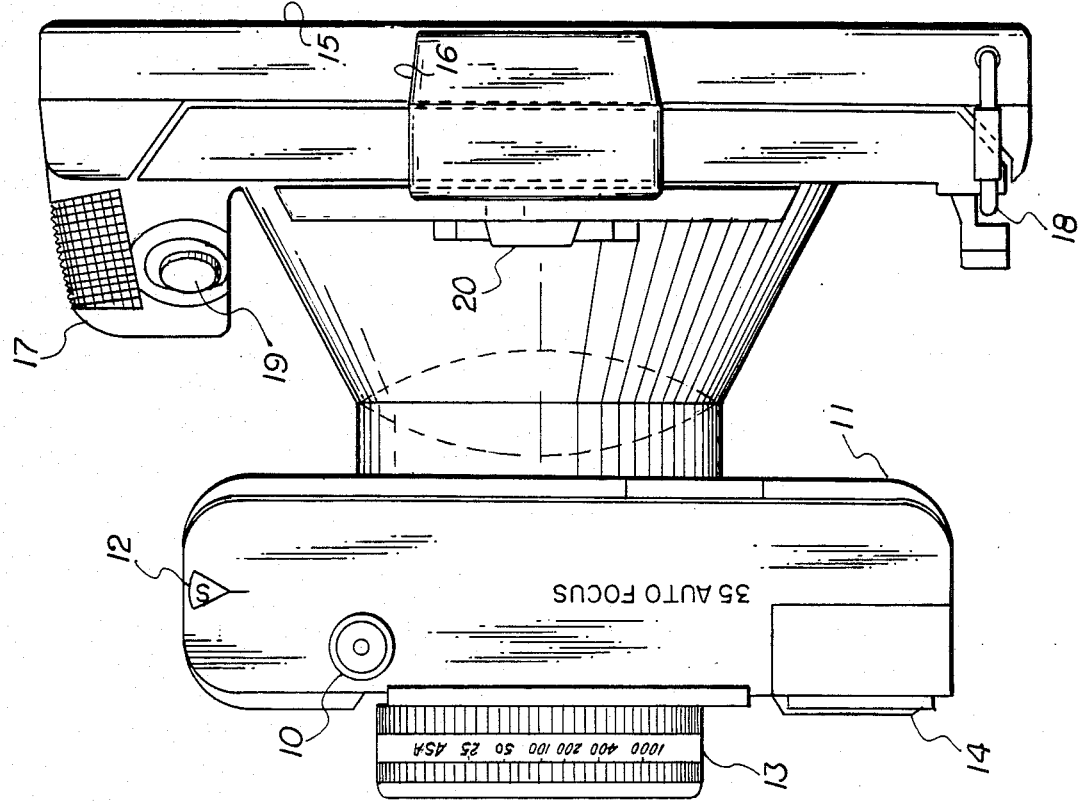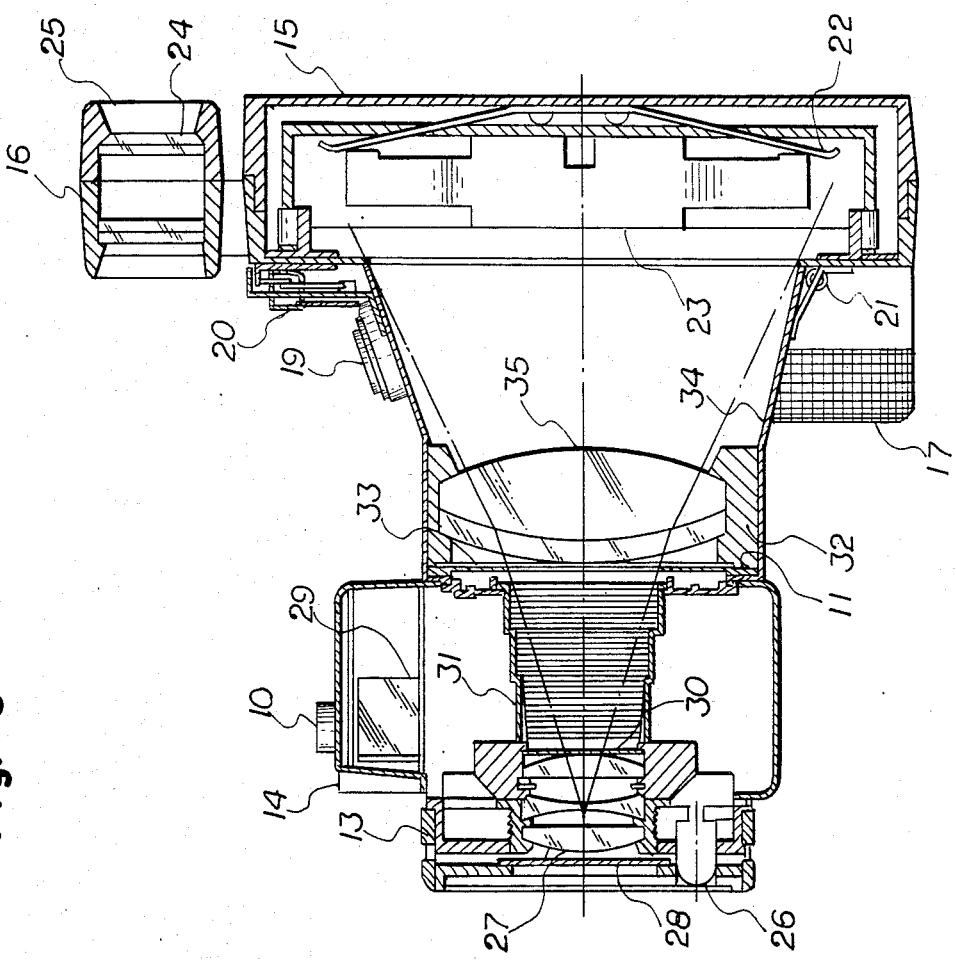

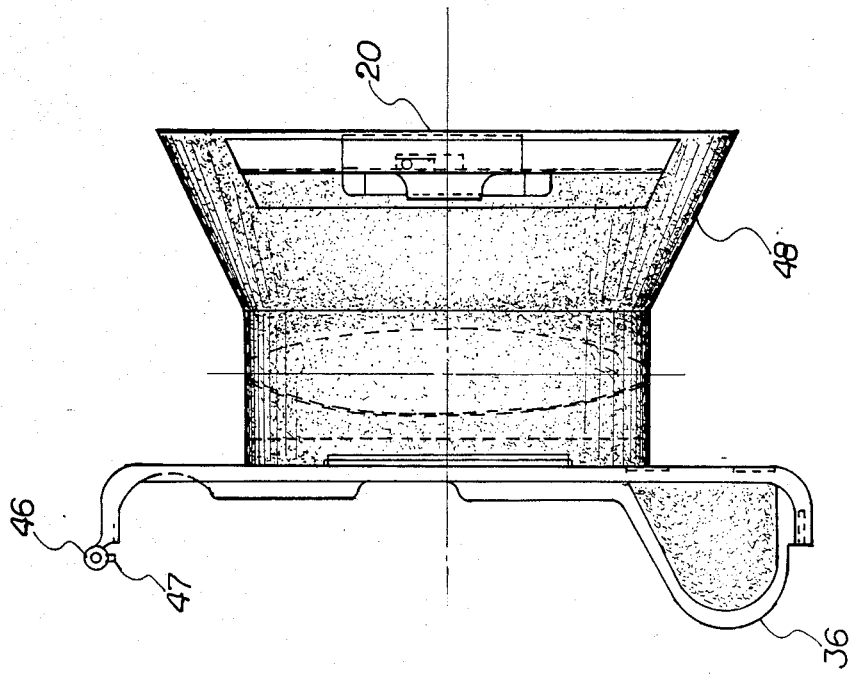
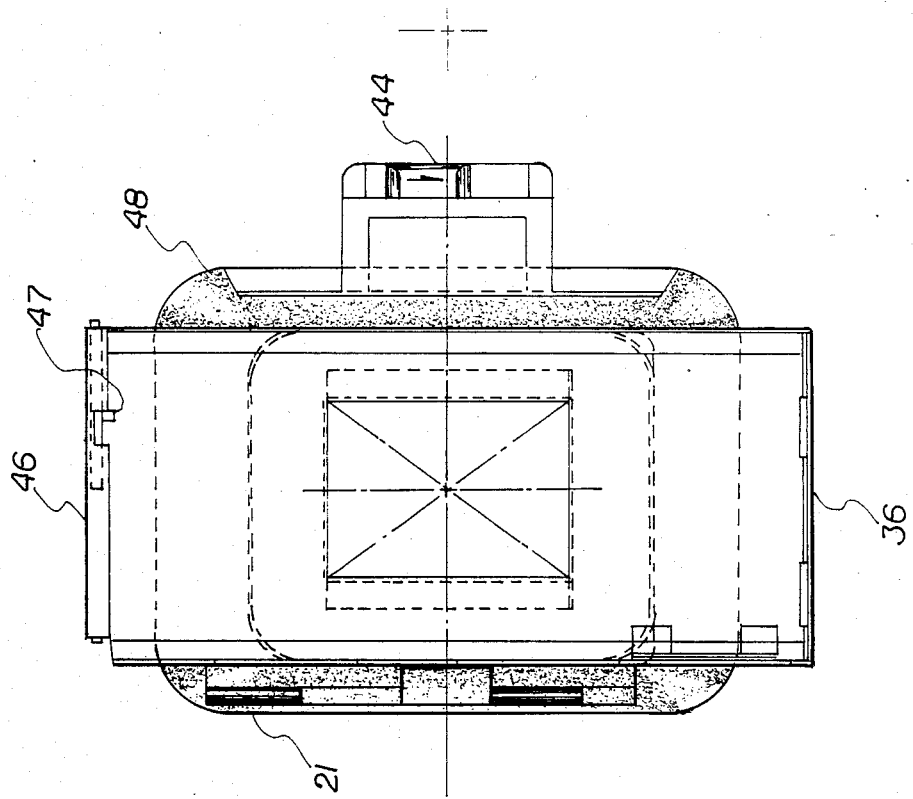

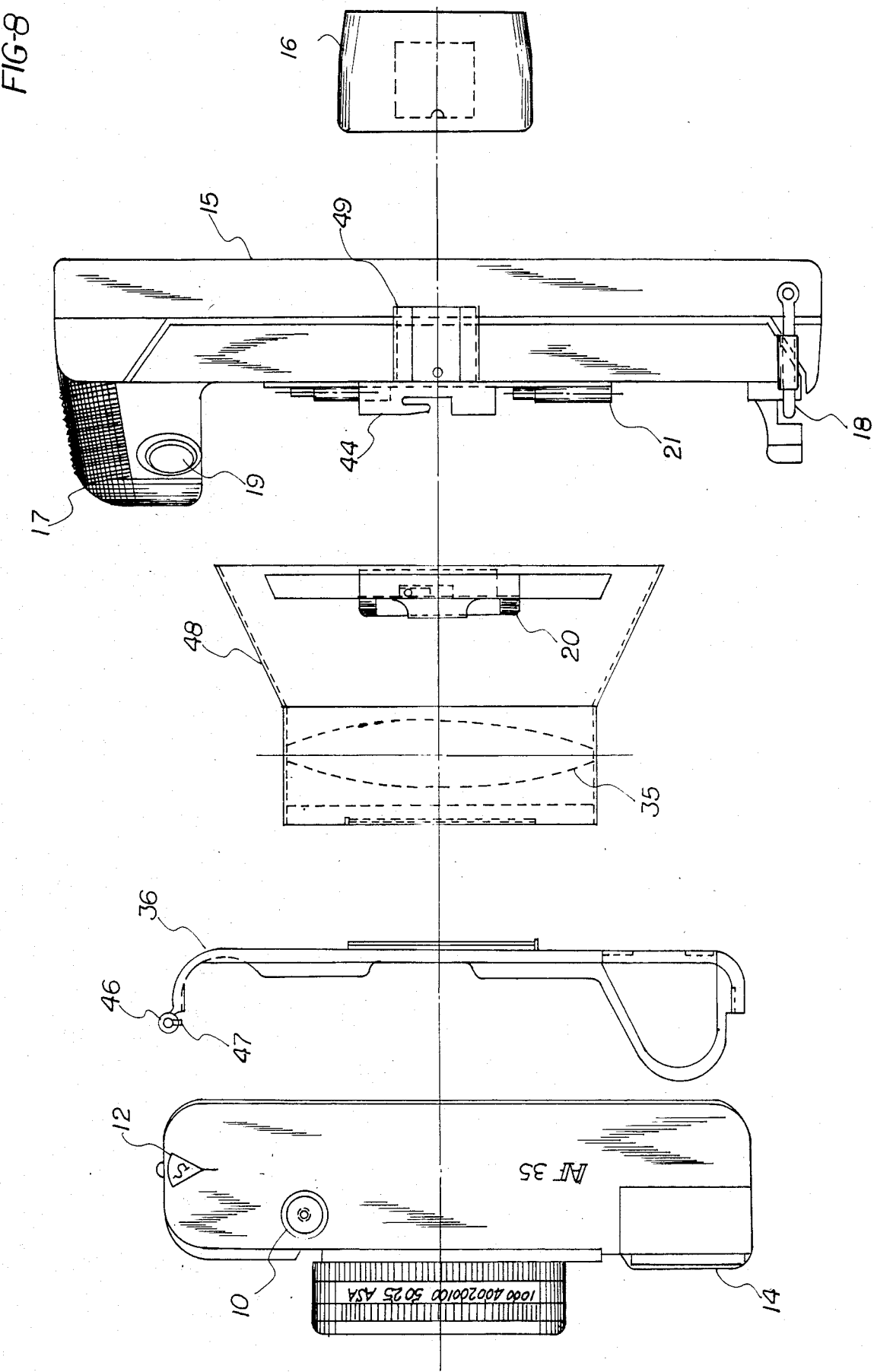

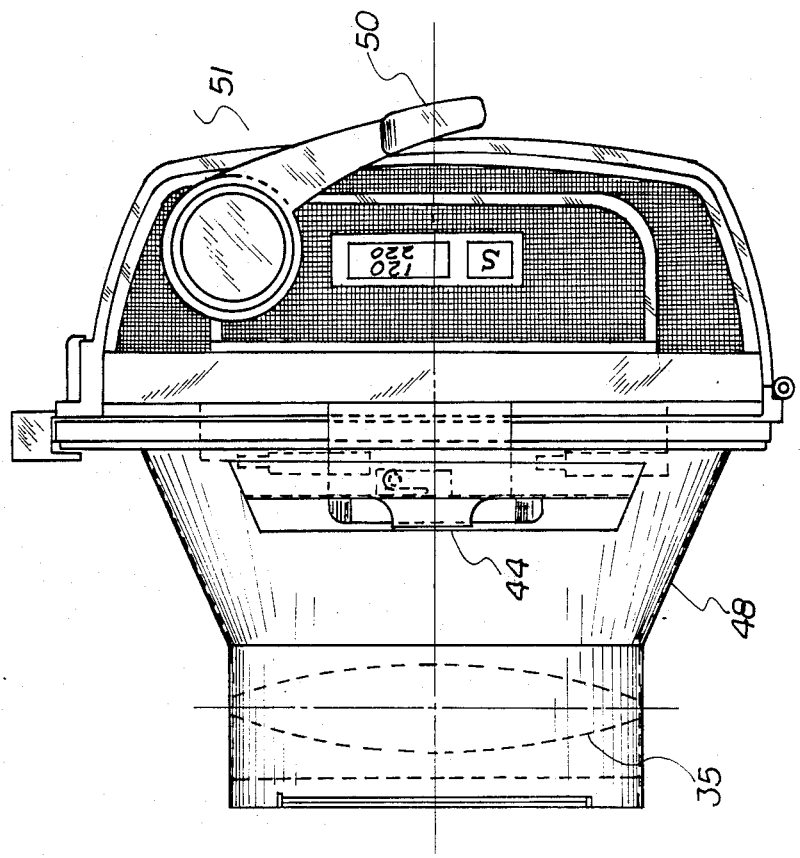
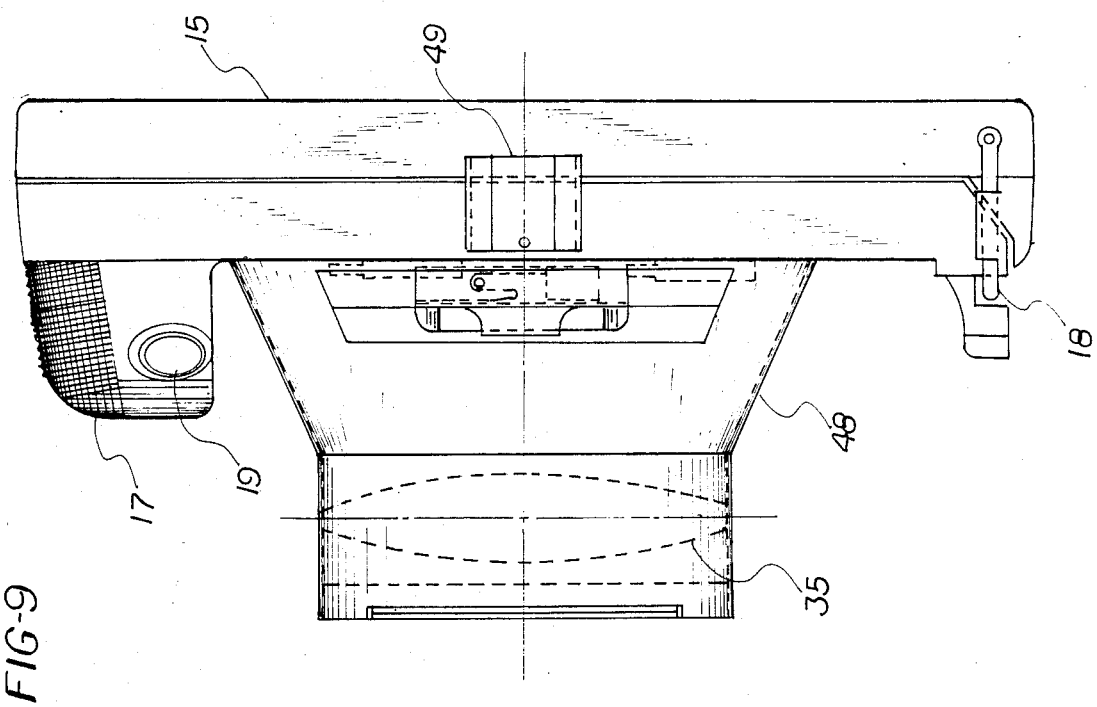

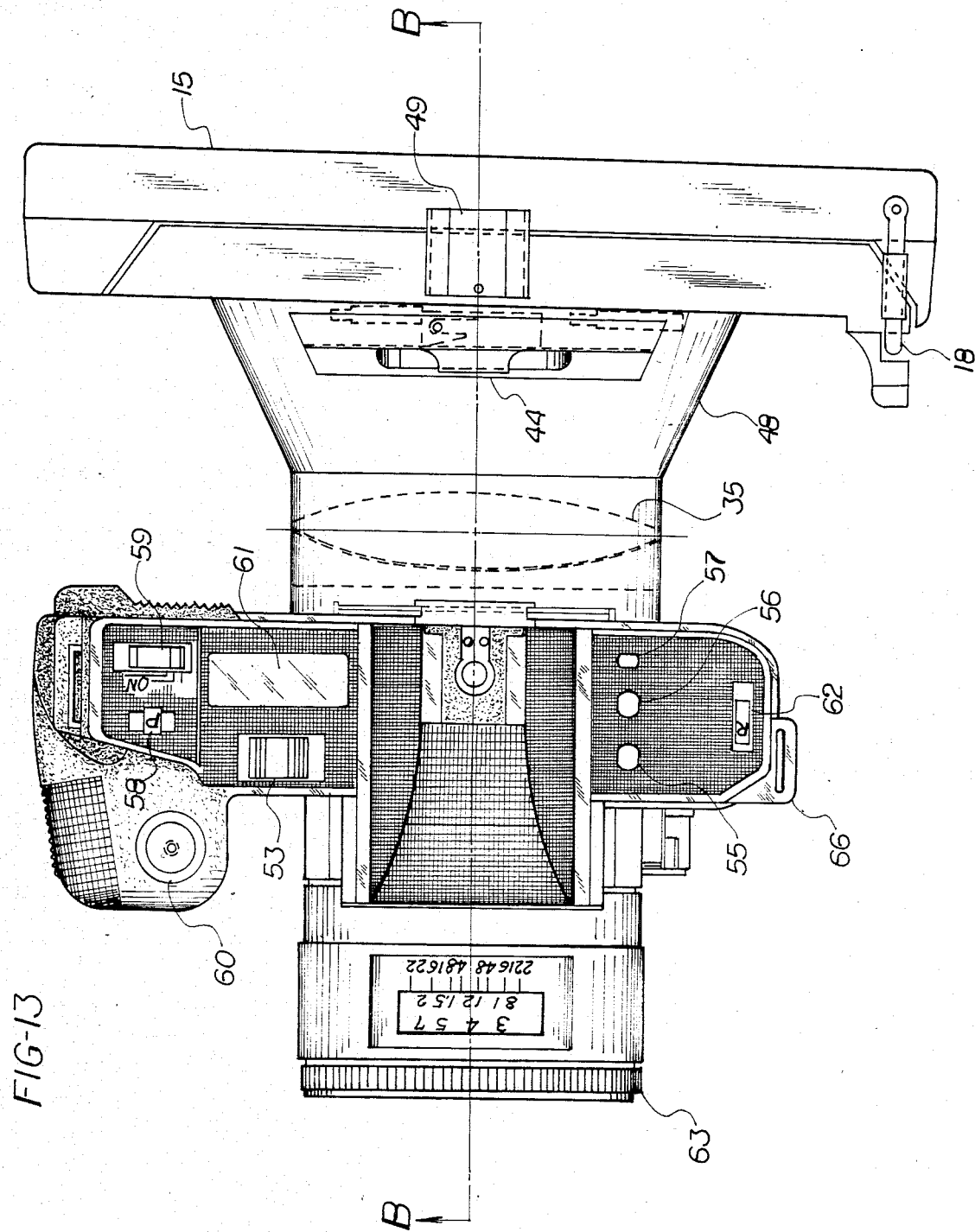

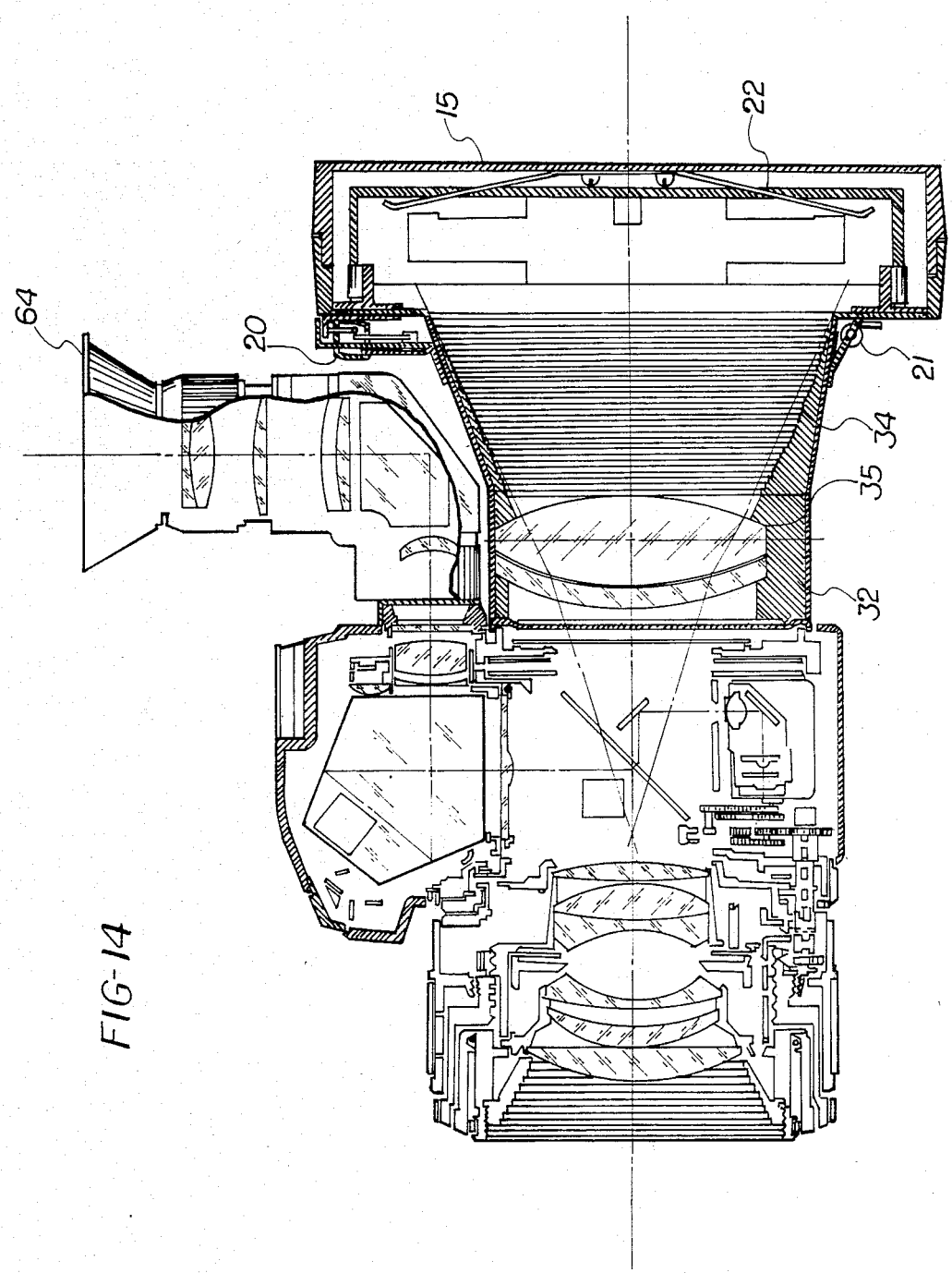

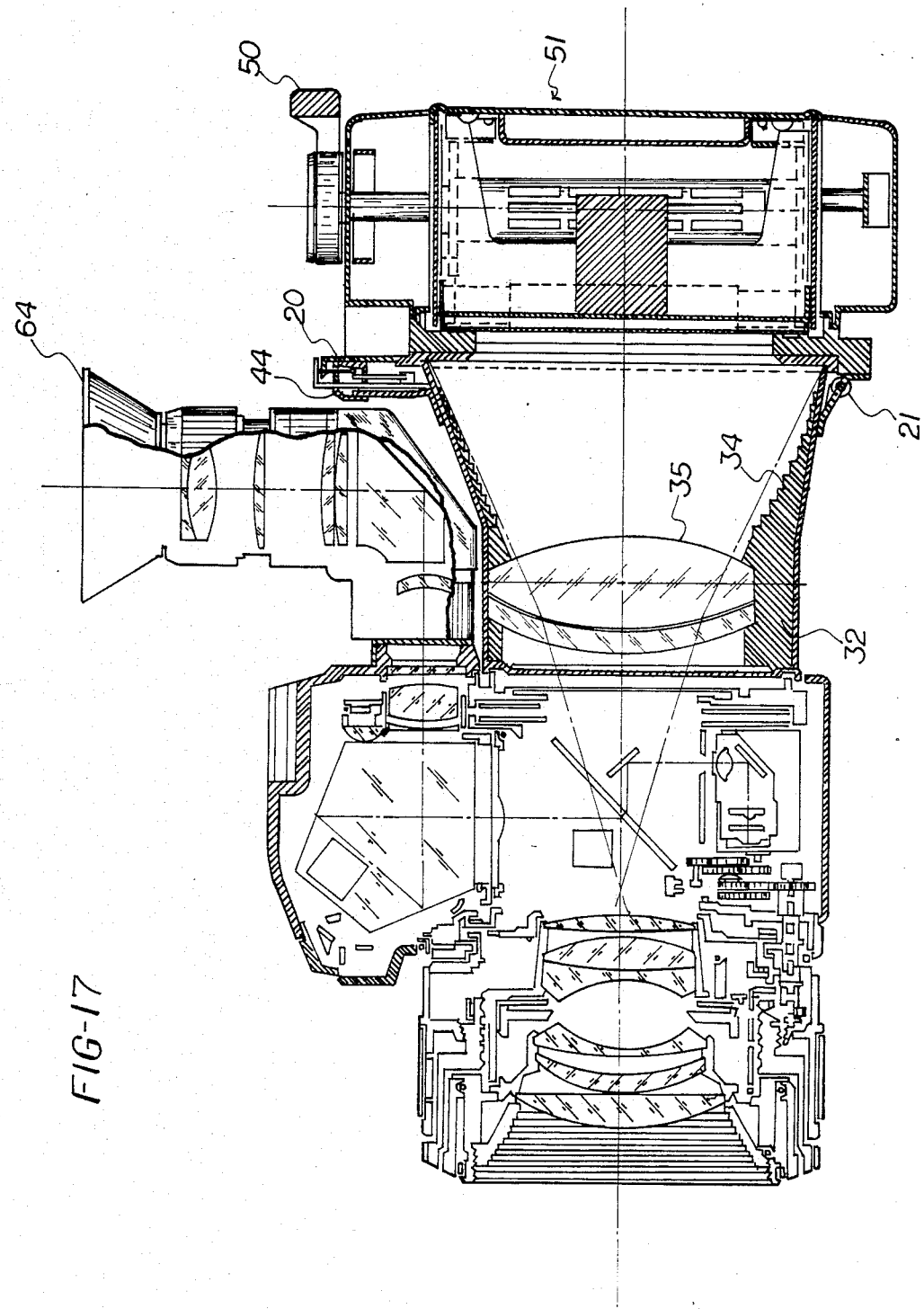

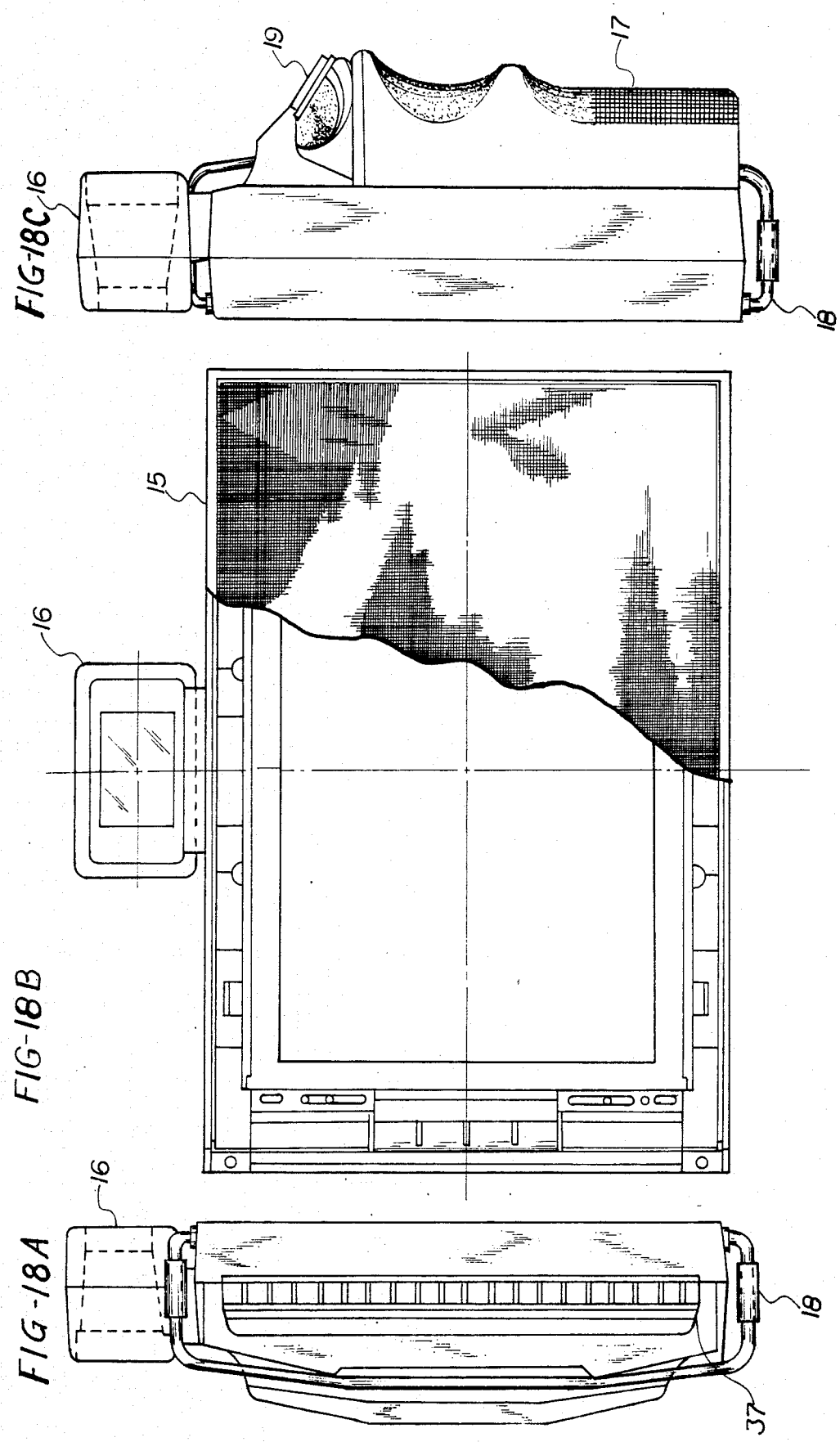

35 MM AUTOMATIC FOCUS CAMERA CONTAINING AN INSTANT FILM

BACKGROUND AND SUMMARY OF THE INVENTION

The present invention relates to a 35 mm automatic focus viewfinder camera and to a 35 mm automatic focus single lens reflex camera (hereinafter referred to as "35 mm camera" replaced above two types of cameras which function as a middle format, more sophisticated, higher performance, instant camera. Through various adjustments and modifications such as in the lens system, the 35 mm camera can be inexpensively converted into a high performance, and instant middle or large format camera, thereby providing a camera which has the double function of utilizing the best features of both cameras; that is, the 35 mm camera and the instant film camera which utilizes Polaroid film, Trimprint film or roll film.

Presently known cameras can be classified into three basic types: a 35 mm small format, small size camera, a middle format, medium size camera and a large format, large size camera. These cameras have their various advantages and disadvantages according to their size. Generally speaking, 35 mm cameras have the advantages of handling ease, responsiveness, inexpensive price, and compact construction. However, this camera has such disadvantages as poor quality of the photograph, including color and sharpness of image; inability to use instant film, roll film or 4"×5" sheet film because of its small size and no lens which is capable of converting the image to middle or large format size and quality. On the other hand, a middle or large formal instant camera such as a polaroid or a trimprint camera can produce a photograph of high quality color and image sharpness by utilizing roll film, Polariod film or Trimprint film. However, these cameras are very expensive and large in size and thus are very inconvenient to carry and use.

A demand has developed for a camera which combines the best features of both the small 35 mm camera and the middle or large instant camera while eliminating the disadvantages features of these cameras, that is, a camera which is small and compact in size, easy to operate and carry while at the same time is capable of producing magnificently sharp, true-color images and create photographs by using instant films or roll films.

OBJECTS AND SUMMARY OF THE INVENTION

Accordingly, an object of the present invention is to provide a modified 35 mm camera containing instant film which has the function of selectively performing as a 35 mm camera, a mid format camera, or a Polaroid camera.

Another object of the present invention is to provide a modified 35 mm camera having a special lens which is inexpensive, small, compact in size and easy to handle, and which, at the same time, is capable of taking pictures with magnificently sharp, true-color images comparable to those which can be taken with mid format roll film or larger instant film cameras.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

The present invention as described is directed to a 35 mm automatic focus camera equipped with an improved lens system such as specialized lens and a Polaroid or a roll film back attachment which make it possible to convert a 35 mm automatic focus camera which possess the advantages of a small size camera to a polaroid or a middle format camera which utilizes instant film or roll film with the attendant advantages discussed hereinabove.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is a cross-sectional view of the present invention, taken along line A—A of FIG. 6.

FIG. 6 is a top view of a 35 mm camera containing instant film in accordance with the present invention;

FIGS. 7A and 7B are a front and side views of the lens housing attachment for the 35 mm automatic focus camera in accordance with the present invention;

FIG. 8 is an exploded perspective view of the basic components of the camera of the present invention;

FIG. 9 is a plan view showing a Polaroid film back attachment to the lens housing in accordance with the present invention;

FIG. 11 is a plan view showing a 120 and 220 mm film back attachment to the lens housing in accordance with the present invention;

FIG. 13 is a top view of a 35 mm automatic focus single lens reflex camera which is converted to a Polaroid camera in accordance with the present invention;

FIG. 14 is a cross-sectional perspective view of the present invention, taken along line B—B of FIG. 13;

FIG. 17 is a longitudinal cross-sectional view of the present invention, taken along the line A—A of FIG. 16; and FIGS. 18A, 18B and 18C are left-side, back and right side views of the Polaroid film back attachment of the present invention.

DETAILED DESCRIPTION OF THE INVENTION

Figure 1:
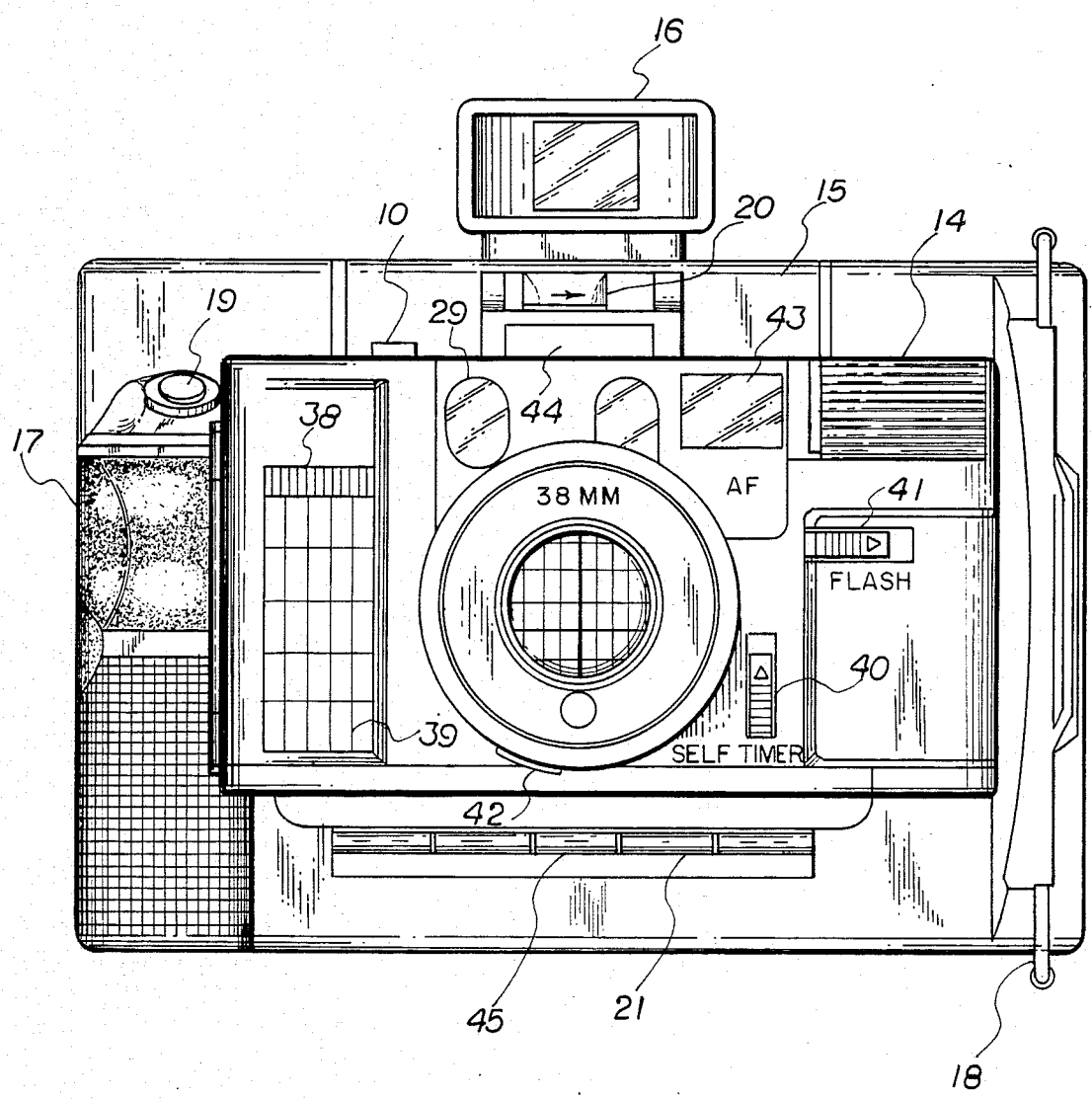
FIG. 1 is a front view of a 35 mm camera containing the instant film of the present invention.
Figure 3:
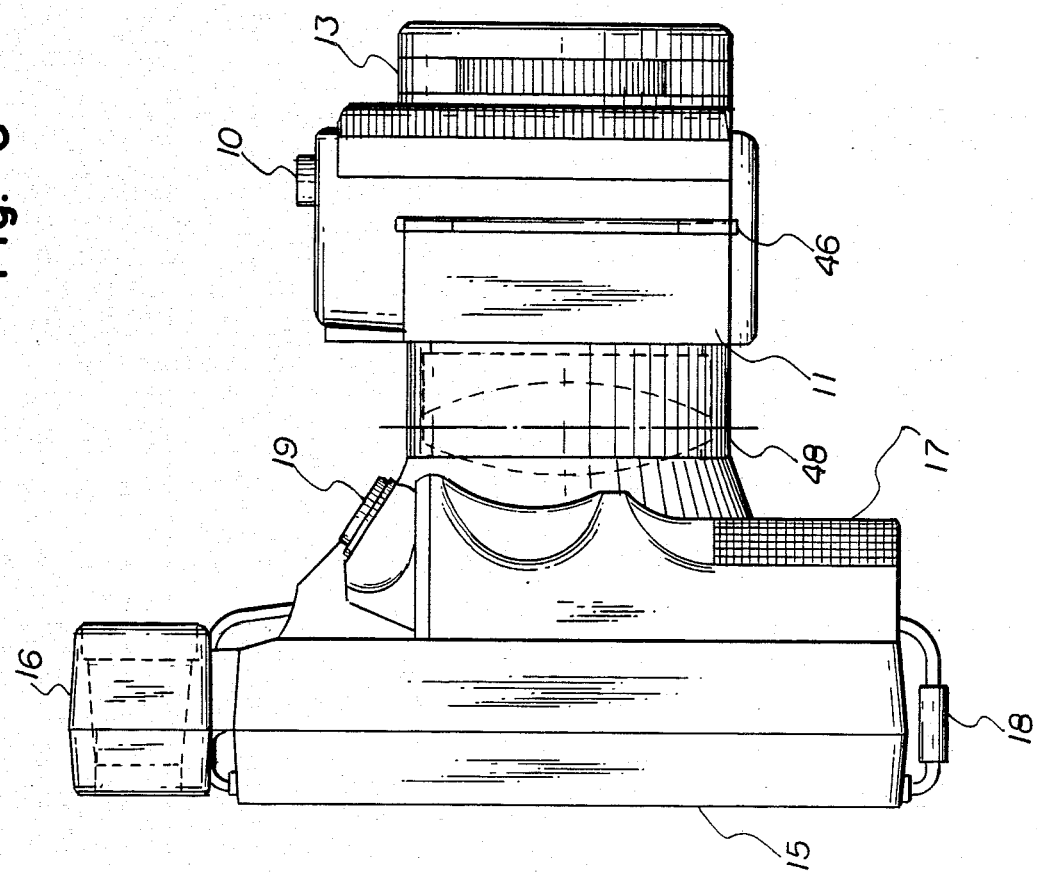
FIG. 3 is a right hand side view of FIG. 1 of the present invention.
Figure 2:
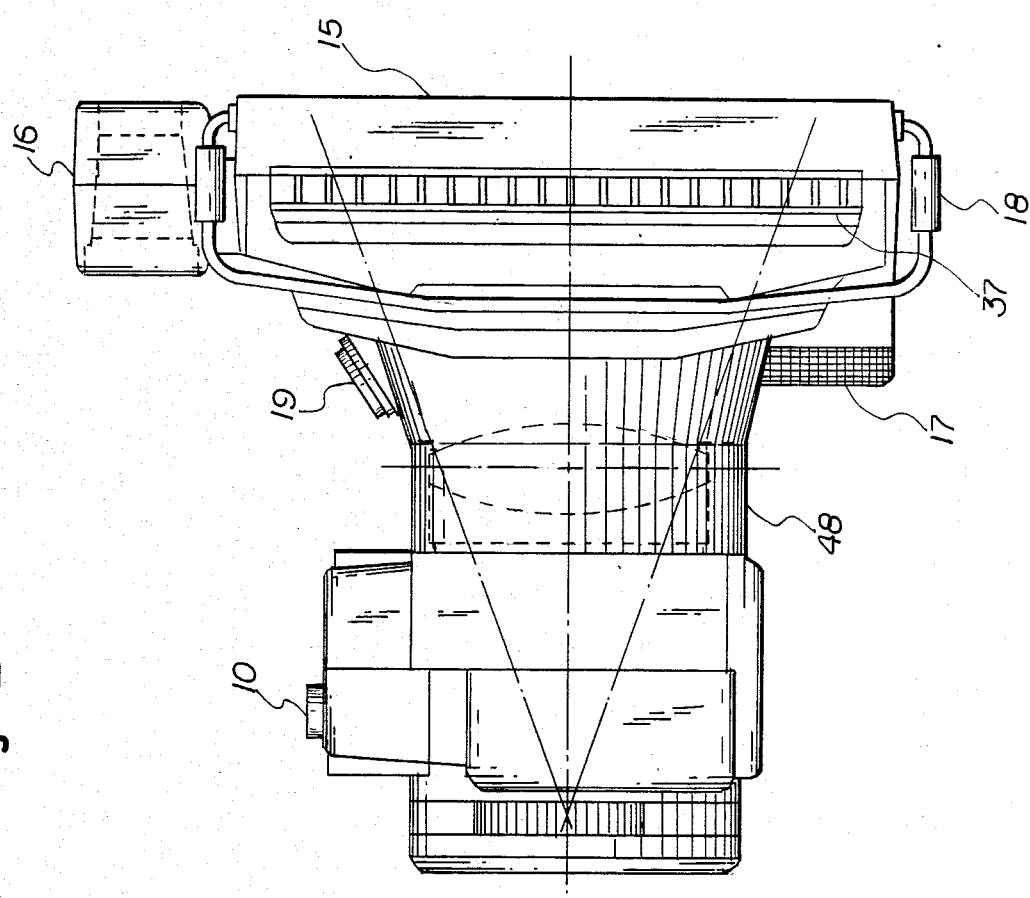
FIG. 2 is a left hand side view of FIG. 1 of the present invention.

Referring now in detail to the drawings for the purpose of illustrating the present invention, the modified 35 mm camera containing a film back as shown in FIGS. 1, 5, 8, 13, and 17 comprises a standard 35 mm camera, a panel member 36, a lens housing 48 having an achromatic lens 35 and a Polaroid film back 15 or a roll film back 51, whereby the 35 mm camera has the ability of selectively performing as a 35 mm camera, a middle format camera having a roll film or a polaroid camera having instant film such as a Polaroid or Trimprint film.

Figure 10B:
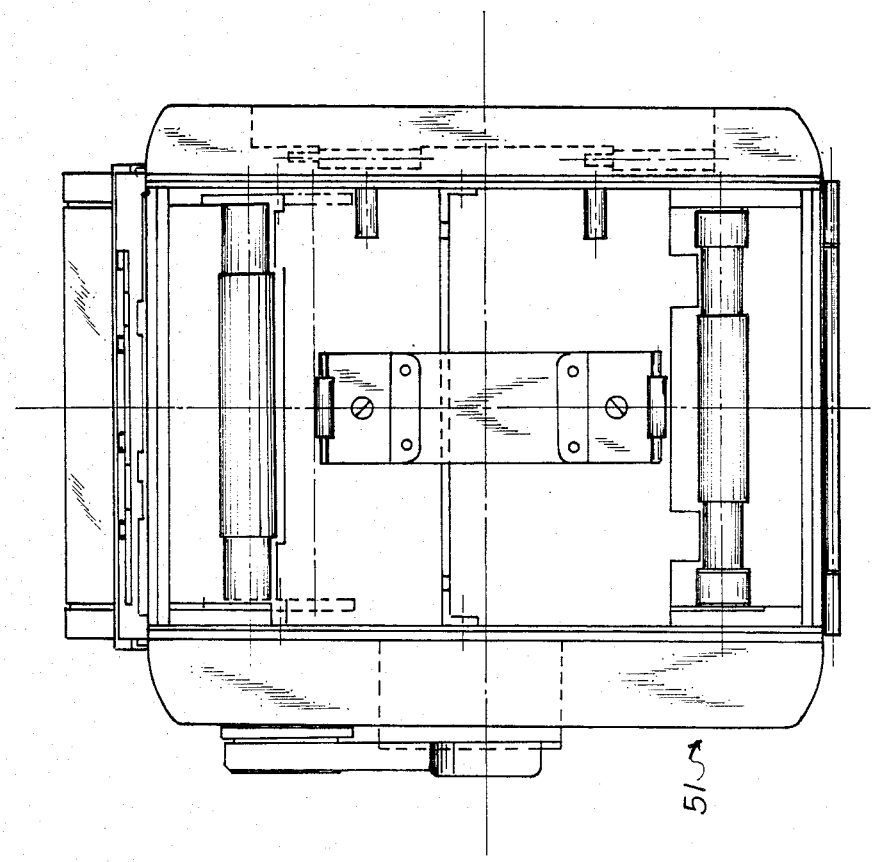
FIGS. 10A and 10B are top and back views of the 120 and 220 mm film back in accordance with the present invention.

FIGS. 1, 2, 3, 5, and 6 show a standard 35 mm automatic focus viewfinder camera which is one of the type which is modified in accordance with the present invention. This camera has all of the standard features of a 35 mm automatic focus camera, including a shutter release 10, an exposure counter 12, a film speed ring 13, a flash 14, a viewfinder 16, a hand grip portion 17, a lens 27, an automatic focus window 29, a self-timer 38, a speaker 39, a self-timer switch 40, a flash lever 41, a lens barrier slider 42, and an automatic focus viewfinder 43. The elements modified as a Polaroid camera are a film compartment door lock 18 (FIGS. 5 and 6), a shutter release 19 for an instant camera, a latch 20 for the instant film back 15 or 51 (FIGS. 10A and 10B), a hinge 21 for the instant film back 15, an instant picture exit slot 37 (FIG. 18), a lock 44 for the latch 20 of the instant film back 15, and a lock 45 for a hinge 21.

Figure 4:
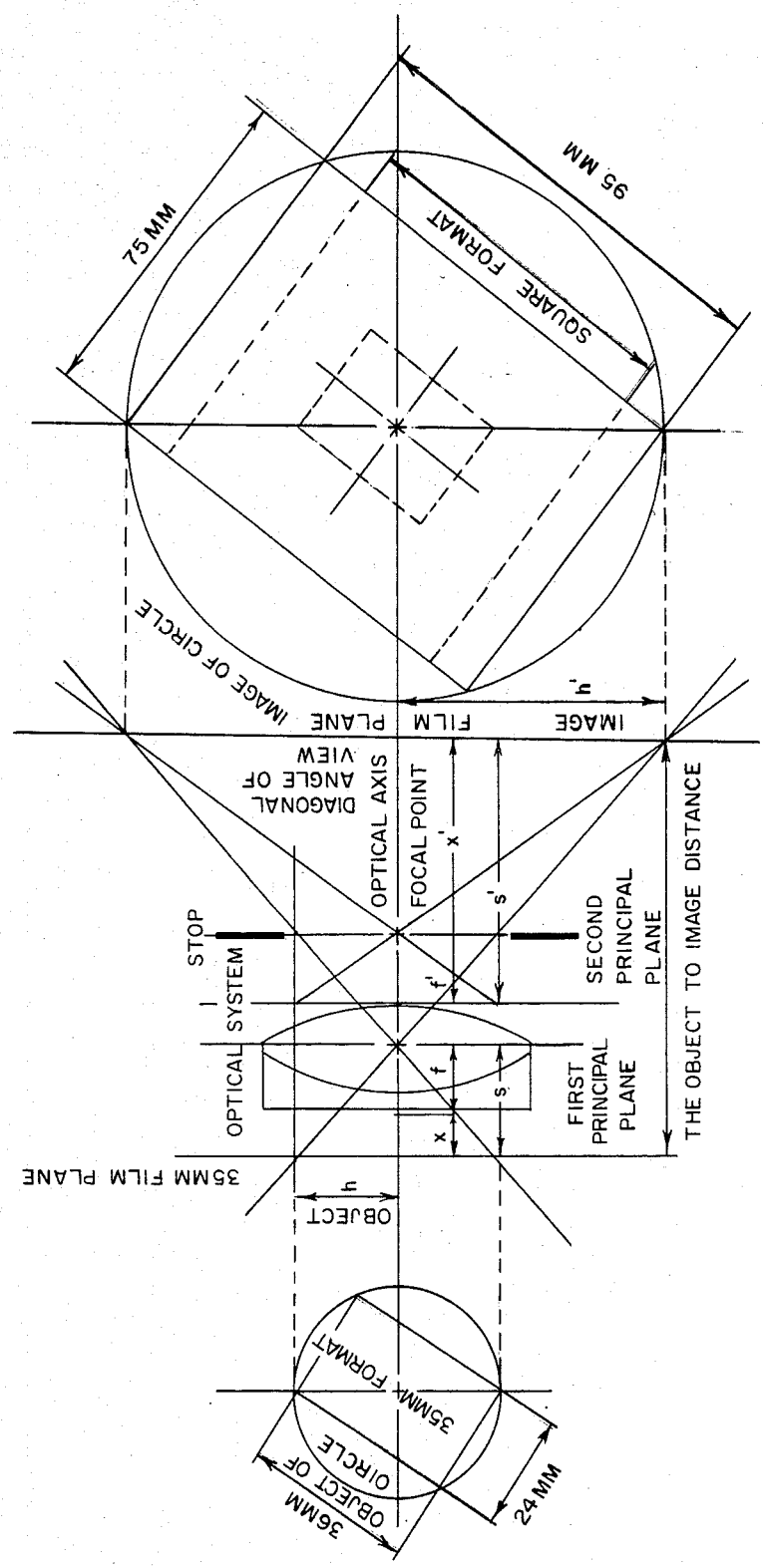
FIG. 4 shows the design of a lens system of the present invention.

As shown in FIG. 4, the image position can be represented by the following equation:

$$h/(h') = (-x)/f$$

and $$h/(-h') = f'/x' \quad (1)$$

$$ff' = -xx' \quad (2)$$

$f = f'$ (under an optical system in air) and $$f^2 = -xx^1 \quad (3)$$

wherein f and f' are first and second focal points, h is an object and h' is an image
x is the distance from the focal point to the object,
x' is the distance from the second focal point to the image,
s and s' are the object distance and the image distance, respectively, from the principle plane, and
when $x = s + f$ and $x' = s' - f$ are substituted in said equation (3), $$f^2 = -xx' = -(s + f)(s' - f) = -ss' + sf - s'f + f^2,$$

Cancelling out the $f^2$ and dividing through by ss'f, the following equations are developed:

$$\frac{1}{s'} = \frac{1}{f} + \frac{1}{s}, \text{ or} \quad (4)$$

$$s' = \frac{sf}{s + f} \quad (5)$$

The lateral magnification of the optical system has a ratio of an image size to an object size as shown in the following equations:

$$m = \frac{h'}{h} = \frac{f}{x} = \frac{-x'}{f} \quad (6)$$

wherein m is a lateral magnification, and when the $x = s + f$ is substituted in said equation (6):

$$m = \frac{h'}{h} = \frac{f}{(s + f)} \text{ and} \quad (7)$$

$$M = \frac{h'}{h} = \frac{s'}{s} \text{ or } m = \frac{h'}{h} = \frac{f}{x}$$

because of $s'/s = f/(s + f)$ in accordance with the equation (5).

The length and width of the rectangle in a 35 mm camera, as shown in FIG. 4, is 36 mm and 24 mm, respectively. Based on these dimensions, the following calculations can be made:

$$\tan \frac{24}{36} = 0.6666$$

$$\tan^{-1} 0.6666 = 33.690°$$

$$\frac{24}{\sin 33.690} = \frac{36}{\sin 56.31} = \frac{x}{\sin 90°}$$

$$x = \frac{36 \times \sin 90°}{\sin 56.31} = \frac{36 \times 1}{0.8320} = 43,269231 = 43.27 \text{ (mm)}$$

In the large circle corresponding to the polaroid format size camera, the length and width of the rectangle are 95 mm and 73 mm, respectively. Using these dimensions the following calculation can be made:

$$\tan \frac{73}{95} = 0.76842$$

$$\tan^{-1} 0.76842 = 37.539434 = 37.54°$$

$$\frac{73}{\sin 37.54} = \frac{95}{\sin 52.46} = \frac{x}{\sin 90}$$

$$x = \frac{95 \times \sin 90°}{\sin 52.46} = \frac{95 \times 1}{0.7929} = 119.81334 = 120 \text{ (mm)}$$

With the above calculations in mind, the actual magnification of the lateral or longitudial dimension is shown by the following calculations:

$$m = \frac{h'}{h} = \frac{f}{x} = \frac{s'}{s} = \frac{120}{43.27} = 2.773284 = 2.773$$

$$\frac{f}{x} = 2.773$$

$$x = 0.361 f$$

$$\frac{s'}{s} = 2.773$$

$$s = 0.361 \, s'$$

$$s' = \frac{2.773}{s}$$

$$f^2 = xx^1$$

$$x' = \frac{f^2}{x} = \frac{f^2}{0.361 f} = \frac{f}{0.361}$$

Accordingly, the following Table I shows various calculations according to the present invention:

TABLE 1

| f Focal Length | x | x' | s (x + f) | s' (x' + f) | s + s' |
|---|---|---|---|---|---|
| 7.5 mm | 2.7075 | 20.775 | 10.2075 | 28.275 | 38.4825 |
| 8 mm | 2.8880 | 22.161 | 10.8880 | 30.161 | 41.0490 |
| 15 mm | 5.4150 | 41.551 | 20.4150 | 56.551 | 76.9660 |
| 17 mm | 6.1370 | 47.091 | 23.1370 | 64.091 | 87.2280 |
| 20 mm | 7.2200 | 55.402 | 27.2200 | 75.402 | 102.6220 |
| 24 mm | 8.6640 | 66.482 | 32.6640 | 90.482 | 123.1460 |
| 28 mm | 10.1080 | 77.562 | 38.1080 | 105.562 | 143.6700 |
| 35 mm | 12.6350 | 96.953 | 47.6350 | 131.953 | 179.5880 |
| 50 mm | 18.0500 | 138.504 | 58.0500 | 188.504 | 256.5540 |
| 85 mm | 30.685 | 235.457 | 115.6850 | 320.457 | 436.1420 |
| 100 mm | 36.1000 | 277.000 | 136.1000 | 377.000 | 515.1000 |
| 102 mm | 36.8220 | 282.548 | 138.822 | 383.548 | 523.3700 |

FIGS. 5, 6, 7A and 7B show how the standard 35 mm camera can be modified to convert a 35 mm camera to one containing polaroid film. Basically, two major modifications must be made, that is, the achromatic lens 35 must be inserted in the modified camera of the present invention in order to magnify the image to the Polaroid film, and in addition, the Polaroid film back 15 must be attached to the lens housing 48 so as to permit it to function as a Polaroid camera. Although the above lens system is preferred, some well known lens systems could be used with some sacrifice in performance.

As shown in FIGS. 5 and 8, the achromatic lens 35 formed in an elliptic configuration is mounted by a lens mount 32 in the lens housing 48. The lens is made of flint glass and crown glass in order to adjust for the different wave lengths and colors. For example one side (front side) of the lens can be made of flint glass and the other side (rear side) can be made of crown glass.

The flint glass is made by melting sand, lead and sodium while the crown glass is made by melting sand, lime and sodium. Optimally, barium can be added to these glasses so as to introduce the additional properties of different reflections and dispersion indices to the lenses. Accordingly, the achromatic lens 35 made of these types of glass possess the high dispersion property of flint glass, and the high reflective power and low dispersion properties of crown glass. Also, the addition of the barium can alter the properties of the achromatic lens 35.

FIG. 8 shows the basic components of the 35 mm camera having the polaroid film back 15 of the present invention. The 35 mm camera so modified can be assembled so that the standard 35 mm camera is further provided with a panel member 36 which facilitates the attachment of the lens housing 48 to the back of the camera. The panel member 36 has a hinge 46 and a spring biased button 47. Subsequently the lens housing 48 is secured to the polaroid film back 15, thus the standard camera secured to the lens housing 48 by the panel member 36 through a spring bias pin 47, is replaced with the Polaroid film back 15 as shown in FIGS. 5 and 6.

As shown in FIGS. 5 and 6 the Polaroid film back 15 can also be connected to a viewfinder camera having a viewfinder 16, having a viewfinder eye-piece 24, and eye-piece frame 25, a pressure plate 22 and a side pressure plate 23. Also, the standard 35 mm camera, including a cds light sensor 26, a lens barrier 28, a leaf shutter 30, a light baffles 31, and a light stepper 33 is mounted to the lens housing 48 which in turn mounted to the Polaroid film back 15 by the viewfinder shoe 49 so that an object can be instantly taken by utilizing Polaroid film or T film.

The spring biased pin 47 disposed at the end of the panel member 36 operates to attach and/or remove the lens housing 48, whether or not it contains the polaroid film back 15. As shown in FIGS. 9 and 11, the lens housing 48 is attached to the polaroid film back 15 by a lock 44 for the latch 20 and by a lock 45 for the hinge 21 (FIG. 1).

Figure 10A:
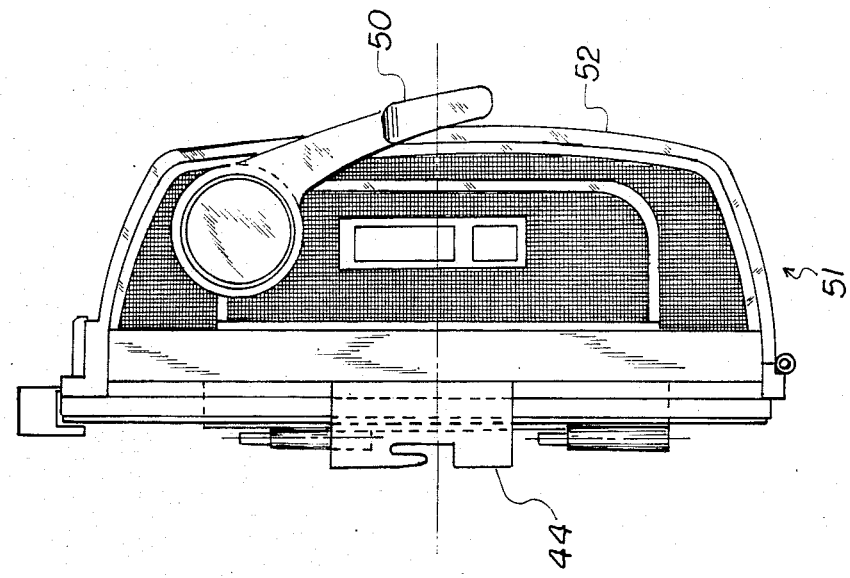
Figure 12:
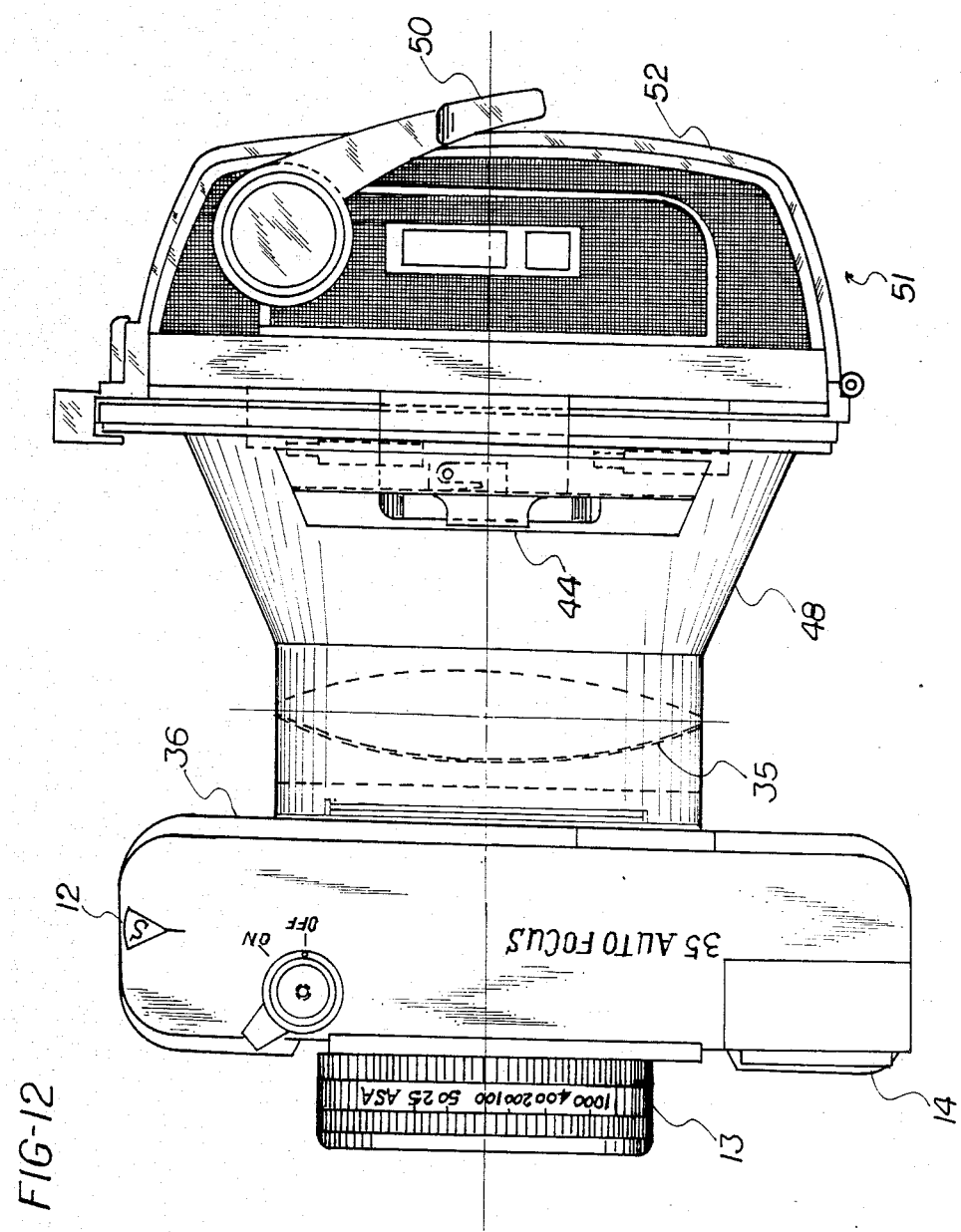
FIG. 12 is a top view of a 35 mm automatic focus camera which is converted to a middle format camera in accordance with the present invention.

FIGS. 10A, 10B, 11, and 12 show how the standard automatic focus viewfinder camera can be modified to convert a 35 mm camera to a modified camera having a roll film back 51 which can contain 120 mm or 220 mm film. As mentioned above, the standard automatic focus viewfinder camera is attached to the lens housing 48 including the achromatic lens 35, and to the roll film back 51 by the hinge 21, and the locks 44 and 45. The roll film back 51 has a film advance lever 50 and a roll film back cover 52 as shown in FIGS. 10A and 12. As the achromatic lens 35 of the modified camera is adjusted according to the present invention in order to accommodate a new focal length, the camera of the present invention can now be operated as a mid format camera which utilizes 120 mm or 220 mm film.

FIGS. 13, 14 and 17 illustrate the modified 35 mm automatic focus single lens camera containing a Polaroid film back 15 which utilizes Polaroid film or Trimprint film.

As described above with respect to the 35 mm automatic focus viewfinder camera, the 35 mm SLR camera of the present invention as shown in FIGS. 13 and 17 has all of the standard features of a 35 mm automatic focus SLR camera, including an exposure mode key 53, an exposure adjustment key 55, a film speed key 56, a shutter speed key 57, a program reset 58, a main switch 59, an operating button 60, a data panel 61, a rewind release 62, a SLR lens 63, and a right-angle viewfinder 64 (FIG. 14). The elements used to modified a SLR camera to a polaroid camera are a SLR panel member 65, the film back member 51, the film back cover 52, the spring biased pin 47, the lens housing 48, the achromatic lens 35 and the lens mount 32, etc., as discussed with respect to the 35 mm automatic focus viewfinder camera as shown in FIGS. 12, 15A, 16 and 17.

In the modified 35 mm SLR camera, the achromatic lens 35 must be inserted into the lens housing 48 to adjust the image to the Polaroid film. In addition, the polaroid film back 15 must be attached to the lens housing 48 so as to permit it to function as a polaroid camera.

As shown in FIG. 14, the achromatic lens 35 disposed at center of the lens housing 48 is composed of flint glass and crown glass to magnify the image on the Polaroid film similarly as in the above-mentioned 35 mm automatic focus viewfinder camera.

Figure 15B:
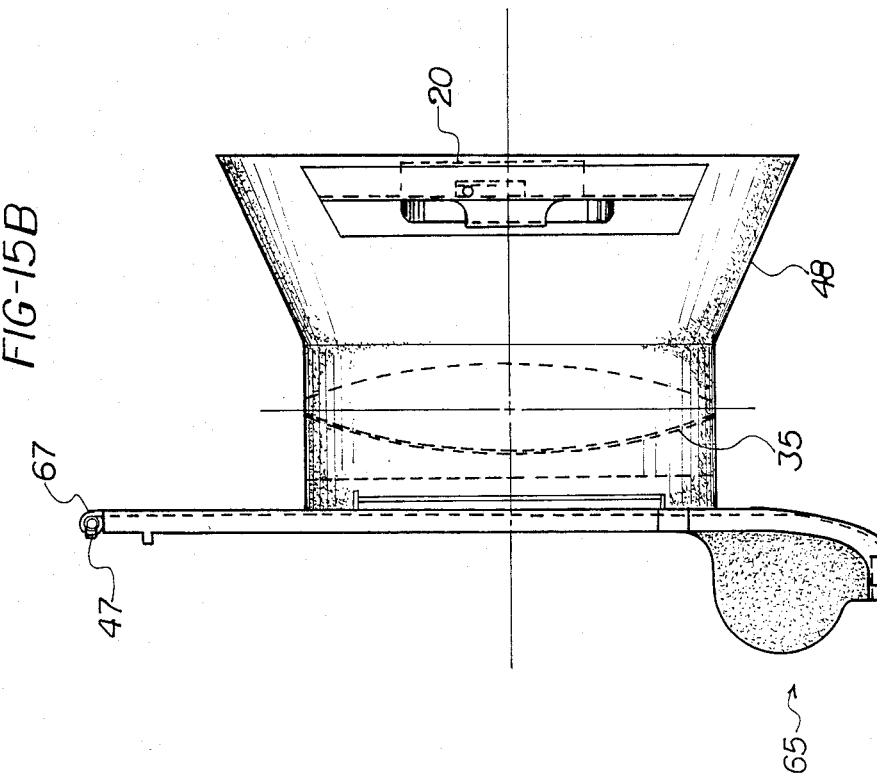
FIGS. 15A and 15B are front and side views of the lens housing attachment for the 35 mm automatic focus SLR camera in accordance with the pesent invention.
Figure 15A:
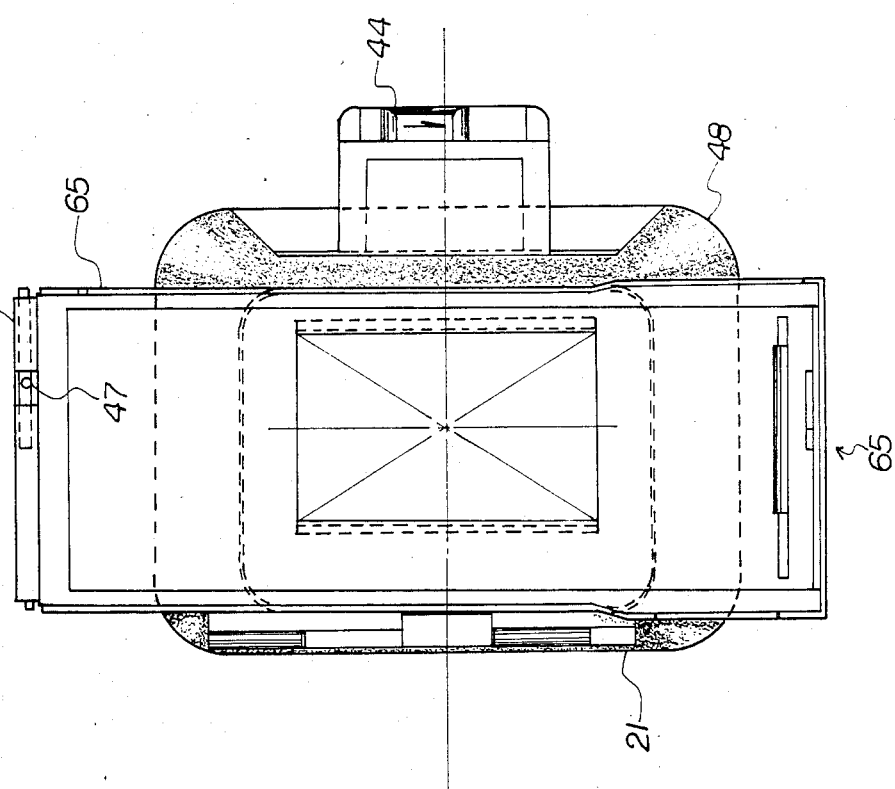

The SLR panel member 65 is distinguishable from the panel member 36 of the viewfinder camera the SLR panel 65 is straight for mating with the standard 35 mm SLR camera as shown in FIG. 15B.

Figure 16:
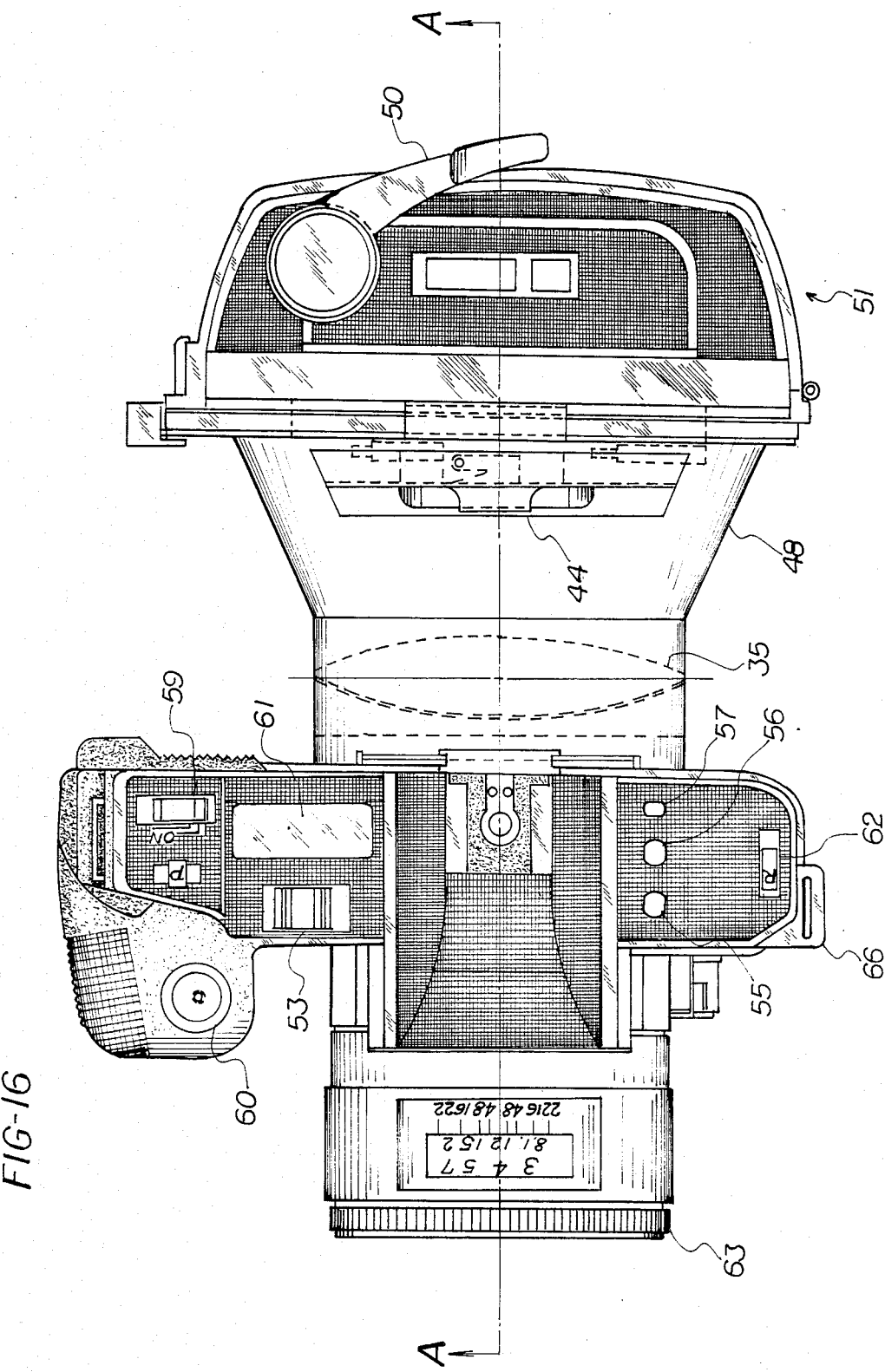
FIG. 16 is a top view of a 35 mm automatic focus SLR camera which is converted to a middle format camera in accordance with the present invention.

As shown in FIG. 16, the roll film back 51 is attached to the standard 35 mm automatic focus SLR film through the lens housing 48 for operating as a mid format camera which utilizes 120 mm or 220 mm film.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A 35 mm automatic focus camera modified to be operated as a mid format or large format camera which comprises:
   a 35 mm automatic focus camera having a casing provided with a removable back portion, said back portion having been removed,
   a lens housing attached to the back of the 35 mm camera, said lens housing containing an achromatic lens system for magnifying the image, and
   a film back means attached to the lens housing, said film back means being adopted to house film to be utilized.

2. The 35 mm automatic camera modified of claim 1 wherein the lens system is an achromatic lens system.

3. The 35 mm automatic focus camera modified of claim 2 wherein the film back contains instant film.

4. The 35 mm automatic camera modified of claim 3, wherein the achromatic lens is disposed at center of the lens housing to adjust the image of an object for magnifying to the instant film of the instant film back.

5. The 35 mm automatic focus camera modified of claim 4, wherein the achromatic lens comprises a flint glass and a crown glass.

6. The 35 mm automatic focus camera modified of claim 5, wherein the flint glass is made by melting sand, lead and sodium.

7. The 35 mm automatic focus camera modified of claim 6, wherein the crown glass is made by melting sand, lime and sodium.

8. The 35 mm automatic focus camera modified of claim 4, wherein the achromatic lens is made of a flint glass, crown glass and barium.

9. The 35 mm automatic focus camera modified of claim 4, wherein the achromatic lens is to provide with an elliptical configuration.

10. The 35 mm automatic focus camera modified of claim 1, wherein the main camera is connected to the lens housing by a panel member disposed between the camera and the lens housing.

11. The 35 mm automatic focus camera modified of claim 10 wherein the main camera is connected to the panel member by a specific biased cementing means and the main camera containing the lens housing is connected to the film back means by a lock-later mechanism.

12. The 35 mm automatic focus camera modified of claim 3, wherein the instant film is Polaroid film.

13. The 35 mm automatic focus camera modified of claim 3, wherein the instant film is a Trimprint film.

14. The 35 mm automatic camera modified of claim 2 wherein the film back means is a roll of film back attachment utilizing 120 mm film or 220 mm film whereby the camera is converted to a mid format camera.

15. The 35 mm automatic focus camera modified of claim 14, wherein the achromatic lens is disposed at middle of the lens housing to adjust the image of an object for magnifying to the roll film of the roll film back attachment.

16. The 35 mm automatic focus camera modified of claim 15, wherein the achromatic lens comprises a flint glass and a crown glass.

17. The 35 mm automatic focus camera modified of claim 16, wherein the flint glass is made by melting sand, lead and sodium.

18. The 35 mm automatic focus camera modified of claim 16, wherein the crown glass is made by melting sand, lime and sodium.

19. The 35 mm automatic focus camera modified of claim 14, wherein the achromatic lens is made of a flint glass, crown glass and barium.

20. The 35 mm automatic focus camera modified of claim 14, wherein the achromatic lens is to provide with an elliptical configuration.

21. The 35 mm automatic focus camera modified of claim 14, wherein the main camera is connected to the lens housing by a panel member disposed between the camera and the lens housing.

22. The 35 mm automatic focus camera modified of claim 1 wherein the 35 mm automatic focus camera is a viewfinder camera.

23. The 35 mm automatic focus camera modified of claim 1 wherein the 35 mm automatic focus camera is an SLR camera.

24. The 35 mm automatic focus single reflect camera of claim 23, wherein the film back contains instant film.

25. A 35 mm automatic focus single reflex camera of claim 23 wherein the film back contains roll film.

* * * * *